Feb. 9, 1932.  J. EHRLICH ET AL  1,844,464
FRICTION TRANSMISSION
Filed July 21, 1930   4 Sheets-Sheet 1

Inventors
Jacob Ehrlich &
John O. Almen
By Blackmore, Spencer & Hirsh
Attorneys

Feb. 9, 1932.  J. EHRLICH ET AL  1,844,464
FRICTION TRANSMISSION
Filed July 21, 1930  4 Sheets-Sheet 2

Fig. 2

Inventors
Jacob Ehrlich &
John O. Almen
By
Blackmore, Spencer & Heidi
Attorneys

Feb. 9, 1932. J. EHRLICH ET AL 1,844,464
FRICTION TRANSMISSION
Filed July 21, 1930 4 Sheets-Sheet 3

Inventors
Jacob Ehrlich &
John O. Almen
By Blackmore, Spencer & Rich
Attorneys

Feb. 9, 1932.  J. EHRLICH ET AL  1,844,464

FRICTION TRANSMISSION

Filed July 21, 1930  4 Sheets-Sheet 4

Inventors
Jacob Ehrlich &
John O. Almen
By [signature]
Attorneys

Patented Feb. 9, 1932

1,844,464

UNITED STATES PATENT OFFICE

JACOB EHRLICH, OF DETROIT, AND JOHN O. ALMEN, OF ROYAL OAK, MICHIGAN, ASSIGNORS TO GENERAL MOTORS RESEARCH CORPORATION, OF DETROIT, MICHIGAN, A CORPORATION OF DELAWARE

FRICTION TRANSMISSION

Application filed July 21, 1930. Serial No. 469,396.

The invention for which the protection of a patent is hereby sought is fully disclosed but not claimed in an application for friction transmission Ser. No. 414,899, filed December 18, 1929, by Jacob Ehrlich.

The invention is illustrated and described as embodied in a transmission, of the kind disclosed in said application, which comprises two disk-like members attached to an assumed driven shaft and an intermediate double surfaced disk-like member connected to an assumed driving shaft in axial alinement with the first named shaft. The assumed driving and driven shafts may, however, be reversed in function. The driving and driven disk-like members, hereinafter designated races, have opposed toric surfaces, hereinafter called race ways, engaged by two series of relatively balanced idler rollers having spheroidal traction surfaces. Torque is, therefore, transmitted from driving shaft to driven shaft by a double surfaced driving race,—the equivalent of two rigidly connected races,—two driven races and two parallel series of idler transmission rollers.

To change the speed ratio it is necessary to change the angle between the axis common to the driving and driven races (the main axis) and the axes of the idler rollers in a plane substantially including both. The movement to effect this change is hereinafter designated a "tilting" movement or "tilt". To do this directly it would be necessary to compel the traction surfaces of the idler rollers to slide on the race ways. This would require a very considerable force, as relatively high pressures are needed to obtain traction when the load is heavy, and, if possible, would result in wear. In the embodiment disclosed the tilting movement is obtained indirectly by rocking the rollers in a plane transverse of the axis of the driving and driven races substantially around an axis joining their points of contact with the race ways; whereupon the forces inherent in the rotating disks and rollers cause the rollers to assume a new speed ratio relation. Said rocking movement requires the application of very little force and is hereinafter designated the "inclining" movement.

The idler rollers are inclined by means of a train of speed ratio control elements extending therefrom to a main control lever which can be locked to and released from a segment by a friction locking device thus permitting infinite gradations of locked position within the range permitted.

An inclining of the idler rollers as described to effect indirectly tilting, or new speed ratio relation, inclines the roller axes with respect to planes which include normally the main axis and the roller centers and imparts to the rollers a tendency to trace spiral paths on the races,—a tendency that would continue unless counteracted. Therefore in accordance with this invention a "return" device is utilized in the form of parallel surfaces oblique to a radial plane including the roller center and the main axis on each roller-supporting trunnion, which afford a tilting axis slightly inclined with respect to a plane normal to the main axis in a plane normal to the axis of rotation of the roller and, in response to the tilting movement, effects restoration of each roller axis into said plane that normally includes the main axis and roller center, thus avoiding the necessity of the operator's trying to stop the spiraling of the rollers by manipulating the main control lever.

The accompanying drawings, in which like reference characters indicate like parts throughout the several views, illustrate one specific embodiment of the invention. In said drawings.

Figure 1:
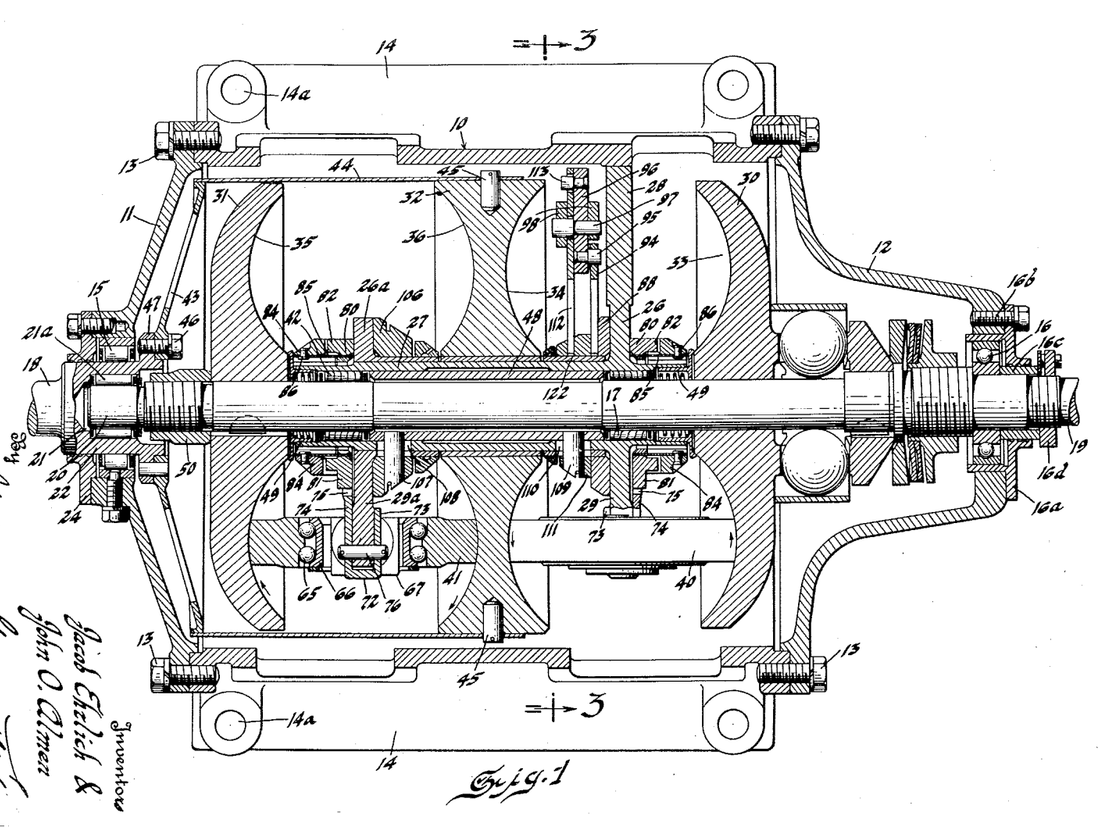
Fig. 1 is a longitudinal section substantially in a plane indicated by the line 1—1 of Fig. 3.
Figure 2:
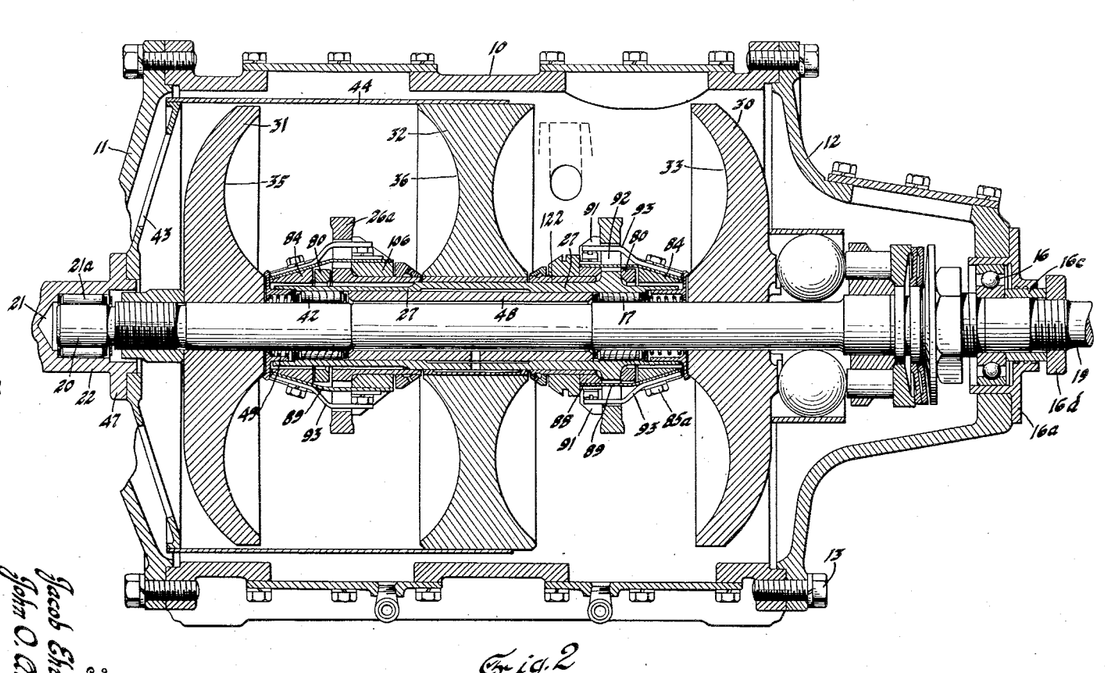
Fig. 2 is a longitudinal section, substantially in a plane at right angles to the plane of Fig. 1, taken on line 2—2 of Fig. 3; but omitting intermediate idler transmission rollers.

Referring to Figs. 1 and 2: Numeral 10 indicates the main body of a transmission housing having opposite open ends covered by closures 11 and 12 removably secured as by bolts 13. Conventional means of fixing the housing to a supporting base or frame are shown as flanges 14 having bolt holes 14a. The housing is equipped with bearings 15 and 16, shown as of anti-friction type, disposed centrally in closures 11 and 12. In the illustrated construction the bearing 15 in closure 11 receives the delivery end of a race-carrying shaft herein considered as the driving shaft; bearing 16 receives the race-carrying driven shaft which also has one end received in a socket in the driving shaft. Closure 11 is therefore at the power input end of the transmission housing and closure 12 at the power output end. The alined and coincidental axes of races, driving and driven shafts constitute the main axis of the transmission.

The transmission shafting essential to the invention comprises a shaft 18, deemed to be the driving shaft, which may be rotated by any suitable prime mover, and a shaft 19, deemed to be the driven shaft, in axial alinement with the driving shaft. One end of the driven shaft (as shown at the left in Figs. 1 and 2) may have a slightly reduced end 20 journaled in a socket 21 formed in the contiguous end of the driving shaft illustrated as enlarged at 22, said enlarged end being supported preferably by rollers within said bearing 15 in the power input end of the housing; an anti-friction bearing for reduced end 20 of the driven shaft may be provided within socket 21 by rollers 21a; and a removable annulus 24 may be bolted to the closure 11 for the purpose of aiding to position the rollers of bearing 15 and to retain lubricant. In a central opening in output end closure 12, bearing 16, shown as a ball bearing, is assembled within a flanged bearing holder 16a bolted to the closure at 16b. The races of the ball bearing 16 may be positioned axially with respect to the shaft 19 and locked against a shoulder thereon by thrust bushing 16c controlled by a lock nut 16d threaded on the shaft. This bearing construction allows shaft 19 and the bearing races, thus longitudinally fixed thereto, to slide axially a limited extent within the flanged holder 16a and hence, also, to move axially with respect to the housing and parts fixed to it.

Driving shaft 18 imparts driving torque to a double faced disc or race 32, free to rotate about the axis of driven shaft 19. Torque is transmitting from disc or race 32 to discs or races 30 and 31, mounted to rotate with shaft 19, by intermediate transmission rollers 40 and 41. With discs or races and rollers positioned as illustrated, driving and driven shafts will rotate in opposite directions at the same speed.

Figures 3, 4:
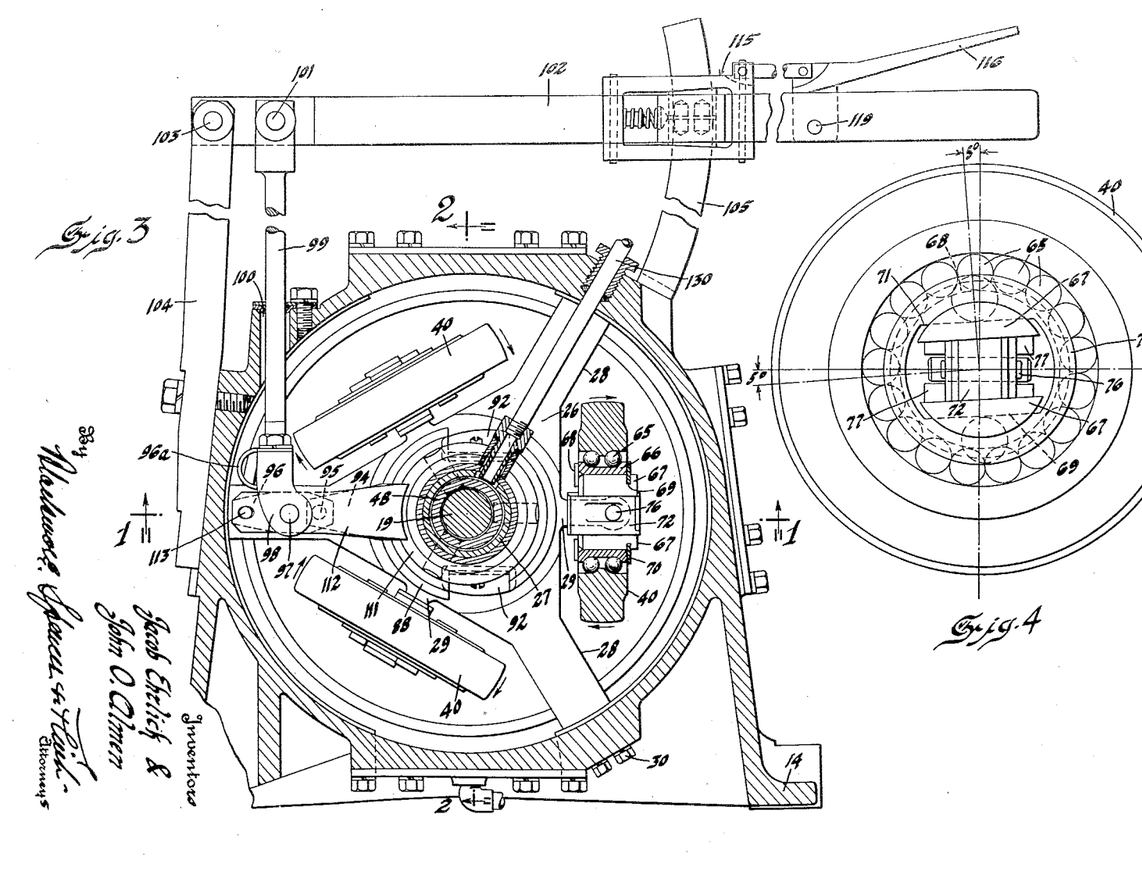
Fig. 3 is a transverse section substantially on line 3—3 of Fig. 1.
Fig. 4 is a detail face view of one of the intermediate idler transmission rollers with its trunnion and associated parts.

In Figs. 1 and 3 a transverse support 26 is shown rigidly united to the housing by means of which and parts rigidly connected to it the rollers 40 and 41 are positioned and maintained with their center points in substantially fixed relation with respect to the main axis and housing. Support 26 is shown as a spider having equally spaced radiating long arms 28 the end of at least one of which is secured to housing 10 as by bolts 30. Short radiating arms 29, rigid with the spider, are spaced equally between the long arms. Said short arms 29 serve to position intermediate transmission rollers 40 in a manner to be hereafter described.

The spider 26 is welded to or otherwise made rigid with a long hub or torque tube 27 near one end—the right hand end as shown in Fig. 1. Pinned to or otherwise made rigid with the torque tube near its opposite end is a second spider 26a provided with short radiating arms 29a equally spaced angularly. Arms 29a serve to position intermediate transmission rollers 41. The positioning arms are shown as three in number on each spider, equally spaced angularly, with the corresponding arms of each spider in the same radial plane. Thus the intermediate rollers will be symmetrically disposed around the axis of the driving and driven shafts and balanced with respect to one another. Bearing rollers 17 are interposed between torque tube 27 and shaft 19 adjacent spider 26; other bearing rollers 42 are interposed between the torque tube and shaft adjacent spider 26a. Shaft 19 may therefore rotate freely within the torque tube.

A spacing tube 48, constituting also an element of speed ratio control mechanism, is interposed between said bearing rollers 17 and 42. Said rollers are spaced from the end races 30 and 31 by short spacing tubes which in the illustrated form of the invention are tubular hubs 49 of oil spray distributors described in detail in said prior application. Sufficient spacing is provided between bearing rollers and spacing tubes 49 to permit slight movement of approach, one toward the other, of said spacing tubes. The length of torque tube 27 is such as to allow races 30 and 31 slight movement of approach one toward another. Spacing and control tube 48 is capable of oscillating within torque tube 27 for the purpose of transmitting control movement to intermediate transmission rollers 41 in a manner to be described.

The two driven races 30 and 31 are connected to driven shaft 19 in such manner as to compel said shaft to rotate with them but to permit relative axial movement of one race toward the other for purposes of adjustment as will presently appear. Double race way driving race 32, interposed between the driven races, is rotatable freely around the axis of shaft 19, being journaled, as illustrated, on torque tube 27. Opposed toric grooves 33 and 34, of similar dimensions, occur in the opposing faces of races 30 and 32, respectively; similar grooves 35 and 36 occur in the opposing faces of races 31 and 32, respectively. Said toric grooves function as bearing and traction surfaces or race ways for said two series of intermediate transmission rollers 40 and 41 which have spheroidal traction surfaces and are positioned by said shorter radial arms 29 and 29a of the spiders 26 and 26a so as to bear on the toric surfaces 33, 34, 35 and 36. Intermediate race 32 is secured to driving shaft 18 by means of the conoidal flange or spider 43 with the rigid connecting member 44, which may be a cylinder, extending from said spider to said race 32 and surrounding but quite free from race 31. In the embodiment illustrated driving pins 45 serve as driving connections between member 44 and race 32. Said member 44 may be welded or otherwise fixed to spider 43, and the latter may be bolted, as at 46, to a flange 47 on the torque delivering enlarged end 22 of the driving shaft.

Race 31 may be keyed to shaft 19 as shown in Fig. 1 and prevented from moving thereon toward the end 20 by a collar 50, preferably adjustably secured to the shaft. Race 30 is free on shaft 19 except as it is compelled to move axially on it and rotate with it by means herein called spring and torque loading devices whereby a predetermined axial thrust is applied at all times and a thrust proportional to the torque delivered is automatically applied between shaft 19 and race 30, tending to cause races 30 and 31 to approach one another and the intermediate driving race 32. The specific form of these devices is not material to the means claimed herein. They are described in detail in said prior application.

Intermediate transmission rollers 40 and 41, which have been stated to be positioned between races 30 and 32, and 31 and 32, respectively, by spider arms 29 and 29a, are of annular form having spheroidal peripheries curved on a radius equal to or somewhat less than the radius of the curve of the toric raceways in a radial plane including the axis of the races. The inner periphery of each annular roller preferably engages balls 65 interposed between it and an annular race 66.

In order to vary the speed ratio of the driving and driven shafts, intermediate transmission rollers 40 and 41 must be caused to tilt, by which is here meant to change the angular position of their axes in radial planes including the main axis of the transmission. In so tilting, if the periphery of the intermediate rollers are caused to engage the central driving race 32 on circular paths nearer the main axis than paths where they engage the driven races 30 and 31, the speed of the driven shaft obviously will be lower than the 1:1 speed ratio obtained when the peripheries of the intermediate rollers engage the driving and driven races at paths equidistant from said axis, as shown in the drawings. Conversely, if the paths of engagement with the driving race are farther from said axis than the paths of engagement with the driven races, the speed of the driven shaft will be greater than said 1:1 ratio.

To enable the speed ratio to be varied bearing rings 66 are mounted on the arms 29 and 29a by means of compound trunnion elements now to be described:

Snugly fitted within each bearing ring 66 are two diametrically opposed trunnion blocks 67. These trunnion blocks 67 are of parti-cylindrical contour,—as if sliced from a cylinder or planes parallel with the axis and each other. A block locating member 68 is rigid with each trunnion block at its inner end, projecting beyond the curved surface as illustrated. They are shown in the drawings as flat discs welded to the ends of the blocks. When assembled within the bearing ring 66, members 68 serve to position blocks 67 with their inner ends substantially flush with the inner face of the bearing ring. The opposite end of each block 67 is kerfed as at 69 to receive a second locating member, shown in the form of a flat ring 70 having opposed internal segments 71 bounded by straight parallel edges (chords of a circle) seated in the kerfs of opposite trunnion blocks with its inner face in contact with the bearing ring 66,—thereby assisting to hold the two blocks of a trunnion in proper relative position with respect to each other and to the bearing ring.

Figures 5, 8:
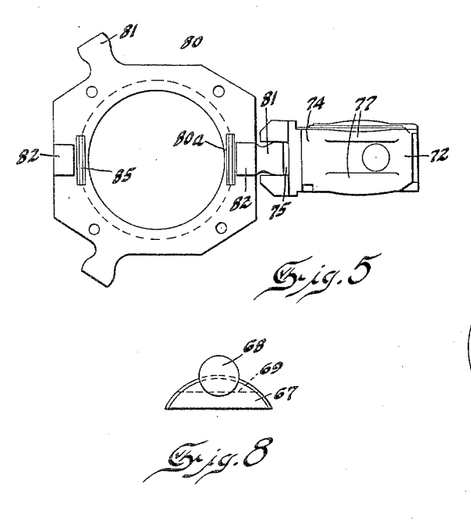
Fig. 5 is a detail showing a ratio control lever actuating ring and one of the idler transmission roller ratio control levers engaged.
Figs. 7 and 8 are details of the idler transmission roller trunnion blocks.
Figure 6:
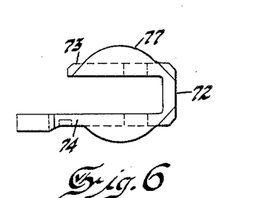
Fig. 6 is a plan of one of the idler transmission roller ratio control levers.
Figure 7:
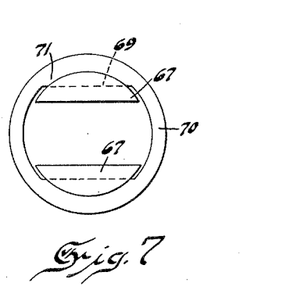

Each of the intermediate transmission rollers 40 and 41, with its bearing and trunnion blocks, is fitted over a trunnion element consisting of a speed ratio control lever 72 of U-form having spaced parallel limbs 73 and 74 of unequal length of which 74 is the longer and has a substantially rectangular notch 75 adapted to be engaged by one of several lugs of a multiple-lugged ring-like actuator 80. (See Figs. 1, 2, and 5.) The limbs of each ratio control lever 72 embrace snugly the sides of a spider arm 29 or 29a (according to which of the two series of transmission rollers it is used with) and is fulcrumed on said spider arm near its outer end by pin 76.

Opposite faces of lever 72 transverse of the spider-embracing surfaces are parallel and oblique to a plane including the fulcrum axis (axis of pin 76) cutting the lever lengthwise,—a plane which, in the 1:1 ratio condition shown in the drawings, is a radial plane including the main axis and axis of rotation of the intermediate transmission roller. The obliquity of said opposite faces may be approximately 5° (measured in a plane perpendicular to the plane that includes the main axis and the roller center and parallel to the main axis,) in the exemplary embodiment as indicated in detail Fig. 4. Opposite trunnion blocks 67 have their flat surfaces bearing lengthwise on said oblique faces of lever 72; and to provide area of bearing surfaces adequate to prevent clocking of the trunnion blocks each limb of the lever arm 72 may have outward-bulging flanges 77 having surfaces co-planar with and constituting part of said oblique bearing faces. Thus provision is made for tilting each of the rollers 40 and 41 about an axis which is inclined at an angle of about 85° to a radial plane including the main axis and roller center in a plane normal to the axis of rotation of the roller. The sense of inclination of the axis about which a roller may tilt is from the roller center toward that quadrant of the driving race which is approaching the point of contact between race and roller as shown in Fig. 4. Inclination of the axis of the roller as described in the said tangent plane by the means described provides for returning the roller axis into a radial plane in response to the tilting movement of the rollers initiated by inclining the axis out of the radial plane; this constitutes the return device referred to hereinbefore. From the disposition of each transmission roller and the elements constituting its trunnion and connection to the spider arm that positions it, as described, it will be apparent that a rocking or inclining movement imparted to ratio control lever 72 in a plane normal to the main axis will forcibly incline the roller similarly, that is, will incline the axis of rotation so that if extended it will pass to one side of the main axis instead of intersecting it; and also that this inclination may be imparted by the application of very little force since the roller pivots substantially on its points of surface contact with the opposite toric race ways in races 30 and 32, or 31 and 32, as the case may be. The roller, however, is free to "tilt" about an axis slightly inclined with respect to the perpendicular to the plane that includes the main axis and the center of the roller, i. e., its axis of rotation may freely turn so as to assume positions at various angles to the main axis,—trunnion blocks 67 then rotating on and in the planes of the oblique faces of the particular ratio control lever 72.

The rocking or inclining movement referred to is designed to be imparted to the intermediate transmission rollers manually. The tilting movement referred to follows automatically from the relations thus brought about between the intermediate transmission rollers and the driving and driven races. The oblique axis on which the rollers tilt automatically checks the tilting movement, restoring the rollers in their newly assumed speed ratio position to the normal position in which the axis of rotation intersects the main axis, which is necessary in order that the inherent forces which control the tilting of the rollers may continue in equilibrium.

The rocking movements of ratio control levers 72 about the pins 76 in spider arms 29, 29a, to effect inclination of intermediate transmission rollers 40 and 41 in planes transverse of the main axis are imparted by a main control lever 102, shown in Fig. 3, which is adapted to operate in unison two trains of link and lever control mechanisms extending in parallel from the main lever to the two series of ratio control levers 72, which control, respectively, the two series of intermediate transmission rollers 40 and 41. By operating said lever 102 all transmission rollers, therefore, are urged to incline simultaneously.

Each of the two trains of link and lever mechanisms referred to by which the lever arms 72 are rocked for the purpose of inclining the intermediate transmission rollers 40 and 41 will be traced backward to the main operating lever common to both trains.

Considering first the train for inclining the rollers 40 illustrated at the right of Figs. 1 and 2 and in Fig. 3:

A ring-like actuating member 80 (Figs. 1, 2 and 5), hereinbefore mentioned, having a plurality of radiating lugs 81—three in number if there are three rollers in the series as illustrated—is sleeved over the torque tube 27 close to and on the power output side of spider 26 as illustrated in Figs. 1 and 2. The orifice through ring-like member 80 is substantially larger in diameter than that portion of the torque tube over which it is sleeved. Lugs 81 of the ring-like member 80 have convexly curved edges and engage within the described notches 75 of speed ratio control levers 72. In the normal relative positions of ring 80 and speed ratio levers 72, room is provided for movement of ring lug 81 lengthwise of lever 72. The ring 80 is also provided with diametrically spaced lugs 82 jutting from the face removed from contact with spider 26 in a direction parallel with the axis.

Referring to Figs. 1, 2, 5, 9 and 10: Lugs 82 on actuating ring 80 engage corresponding diametrical grooves 83 formed in a floating coupling ring 84. Coupling ring 84 is sleeved over torque tube 27 so that it may both rotate and move transversely with respect to the main axis, as shown at the right of spider 26 Figs. 1 and 2. Diametrically opposite flat springs 85, each having one end riveted as at 86 in an internal groove 87 of the coupling ring, extend into slots 80a in actuating ring 80. The springs are disposed so that torque applied to ring 84 is transmitted edgewise of the springs to ring 80. Loosely interlocking lugs and grooves 82 and 83 are not essential but insure torque compelling connection between the said rings even though springs 85 should break or otherwise give way.

Figure 9:
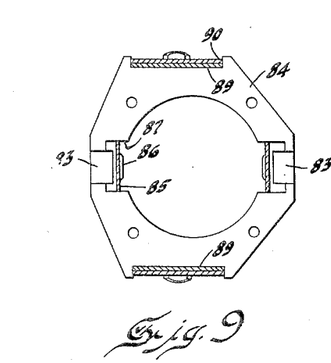
Figs. 9 and 10 are a face view and section, respectively, of a coupling ring in the train of ratio control elements.
Figure 10:
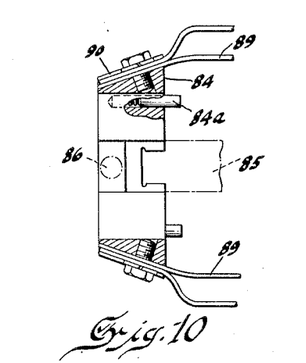

Referring now to Figs. 2, 9 and 10: Coupling ring 84 is connected to a control ring 88 (journaled on sleeve 122 surrounding the torque tube) by flat springs 89 arranged 180° apart but 90° from springs 85. Springs 89 are clamped at one end in external notches 90 formed in coupling ring 84, and at the other end in notches 91 in control ring 88. Springs 89 pass through openings 92 in spider 26 (Figs. 2 and 3) which allow rotative movement of the parts to which said springs are secured sufficient to effect control. Plates 93 secured to coupling ring 84 by bolts 85a serve as clamps for springs 89 and also project through the openings 92 into notches 91 of control ring 88. Said plates are not essential but function in the same manner as said coacting lugs and notches 82 and 83 on rings 80 and 84, respectively, to hold the control ring and coupling ring in the same angular relation in case springs 89 should give way.

Spring pressed pins 84a are seated in holes drilled into that face of coupling ring 84 which is adjacent to actuating ring 80. The coupling ring is held against movement away from the spider by the anchorage of springs 89 to control ring 88, which bears against the spider 26 on the opposite side. Spring pressed pins 84a function to press, yieldingly, ring 80 against the adjacent face of spider 26 to dampen any vibration that may be set up in said ring 80 or parts movable by or with it.

It will be perceived that rotation of control ring 88 will rotate coupling ring 84 by means of spring and plate connections 89 and 93; and that rotation of coupling ring 84 will rotate actuating ring 80 by means of its spring, lug and notch connections which, in turn, will impart rocking or inclining movement to ratio control levers 72, acting to incline rollers 40 in planes transverse of the main axis. It will also be perceived that springs 85 and 89, respectively arranged on diameters separated 90°, supplemented by plates 93 engaging notches 91 on one of said diameters, and by lugs 82 engaging notches 83 on the other, enable actuating ring 80 to "float", or become laterally displaced with respect to control ring 88 and the main axis without disturbing the capability of the control ring to rotate said actuating ring. The parts described function as a so-called Oldham coupling; but the parts of the coupling illustrated are spring biased to a normal concentric position with respect to the main axis by the flat springs, which also transmit torque.

Control ring 88 has an arm 94 rigid with it. The end of arm 94 is pivoted at 95 to an equalizer bar 96 (Figs. 1 and 3). Said equalizer bar is pivoted by pin 97 between the limbs of the forked end 98 of rod or link 99 which passes through a suitably packed opening 100 in the housing 10, and is joined at 101 to said main control lever 102 fulcrumed at 103 on a support 104 secured to the exterior of the housing. Main control lever is held in any adjusted position by means of a friction lock 115 engaging with a segment 105.

Tracing now the link and lever train from the other series of intermediate transmission rollers, 41, to the main control lever 102, it will be seen upon reference to the left hand portions of Figs. 1 and 2 that another floating actuating ring 80 having lugs 81 engages other speed ratio controlling levers 72 for said series of rollers 41, and that another floating coupling ring 84 is connected to said ring 80 and to a secondary control ring 106 by flat springs and couplings identical with those described in the parallel transmission for controlling rollers 40. Spider 29a is perforated as is spider 29 to permit the passage of springs 89. Except for their reversed position the control elements for rollers 41 are thus far the same as for rollers 40. Secondary control ring 106 is pinned to spacing tube 48 by pins 107, said pins passing through an orifice 108 formed in torque tube 27 and hub of spider 29a, said orifice being of such size and form as to permit the needful rotary movement of the control ring to occur. A second pin or pins 109 passing through another suitable opening 110 in torque tube 27 connects tube 48 to another or primary control ring 111 to which an arm 112 is rigidly attached. The outer end of arm 112 is pivoted at 113 to equalizing bar 96 at the end opposite to that to which arm 94 is pivoted. Thus pin 97 by which the equalizing bar is attached to rod 99 lies between the pivotal connections thereto of arms 94 and 112; and the connections are such that the ratio of length of arm 94 to length of arm 112, measured from the main axis, is the same as the ratio of length of the short arm of the equalizing bar to its long arm—that is, as the distance from axis of pin 95 to that of pin 97 is to the distance from axis of pin 113 to the axis of pin 97. In Figs. 1 and 3 it will be seen that lever 112, as well as equalizer bar 96, is embraced by the limbs of fork 98,—also that lever arm 112 is provided with a perforation 114 sufficiently large to allow free passage of pin 97 and permit slight relative angular movement of arm 112 with respect to arm 94. The orifice in the end of lever arm 112 also is made a little larger than the pin 113 which engages in it in order to compensate for the different arcs of movement of the connected lever arm and equalizer bar. A curved leaf spring 96a secured within the fork 98 of rod 99 bears frictionally on the equalizer bar in such a manner as to bias the equalizer bar toward a position in which the axis of the pins 95, 97 and 113 and the main axis lie in the same radial plane.

Main control lever 102, in the illustrated embodiment, is designed to be operated by hand and, as before stated, to be locked to and unlocked from the segment 105 by means of said friction locking device 115. The friction locking device is manually releasable by movement toward the main lever of a thumb lever 116 pivoted to the main lever at 119. It is automatically locked by elastic or equivalent devices effective when the thumb lever is free from pressure. The specific construction of the locking device is not a part of this invention and is fully described in said prior application.

Lubrication may be effected by a forced circulation, the oil flowing into oil tube 130 which discharges between torque tube 27 and spacing tube 48 whence it distributes through suitable grooves, spaces and orifices to parts needing lubrication.

*Operation*

It is desirable to have the prime mover (not shown) running uniformly at its most economical rate of speed and to vary the output speed by changing the transmission ratio.

Assuming torque to have been applied to shaft 18, as by an internal combustion engine, central driving race 32 will be rotated with shaft 18 at the same speed. Rotation will be imparted by the central driving race to the two driven races 30 and 31, thru the two series of intermediate idler rollers 40 and 41 acting in parallel. As shaft 19 must rotate with races 30 and 31 it rotates in a sense opposite to that of driving shaft 18.

The intermediate idler transmission rollers are illustrated in a position in which continuations of their axes of rotation intersect and are perpendicular to the main transmission axis extending longitudinally thru the centers of driving and driven shafts and races. Consequently all the points or lines of contact between rollers and races are equidistant from the main axis and the speed ratio of driving to driven shaft is 1:1.

Assuming that driving shaft and driving race rotate clockwise (viewed from the left of Fig. 1) driven races and driven shaft of course will rotate counter clockwise viewed from the same observation point. In order to increase the speed of driven shaft (output speed) with respect to that of the driving shaft it will be necessary to tilt the rollers 40 and 41 in planes that include their axes of rotation and the main axis in such directions that their peripheries will contact with driving race 32 farther from its center and with driven races 30 and 31 nearer to their centers; that is, rollers 40 and 41 must be tilted in opposite senses. To accomplish this tilting movement for the purpose of imparting increased speed to the driven shaft with respect to the speed of the driving shaft, main control lever 102 should be moved downward from its position shown in Fig. 3. Downward movement of main lever 102 pushes rod or link 99 downward rocking control rings 88 and 111 counter clockwise (as viewed from the left of Figs. 1 and 2), and also the entire control train extending from said control rings to and including the actuating rings 80 of both series of intermediate idler rollers. Lugs 81 of the actuating rings, engaging ratio control levers as described, rock these levers on pins 76 in a clockwise direction and consequently rock or incline all of the rollers of both series in a clockwise direction as indicated by the arrows adjacent rollers 40 in Fig. 3 thus inclining or bringing the roller axes of rotation into a position where they point to one side of the main axis instead of intersecting it. Inspection of Figs. 1 and 3 will make it evident that the rollers when so inclined will trace spiral paths on the driving and driven races. The paths on the driving race will be expanding spirals and those on the driven races contracting spirals, resulting in tilting the rollers in the senses indicated by the arrows adjacent the rollers in Fig. 1. The pitch of said spirals will obviously vary in proportion to the degree of inclination of said ratio control levers. To decrease the speed of the driven shaft with respect to the driving shaft, ratio control levers 72 and the attached rollers should, of course, be inclined in the direction opposite that described for increasing the relative speed of the driven shaft.

During the spiraling of the intermediate idler rollers on the races the continuations of the axes of said rollers do not intersect the main axis of the transmission—the axis of driven shaft 19—but pass to one side or the other according to whether ratio control levers have been inclined in a direction to increase or decrease output speed. It will be clear that the axes of said rollers must be restored to positions in which continuations of said axes do intersect said main axis, before the forces acting on them thru the races will be in equilibrium so as to maintain said rollers tracking in circular paths on the races. This stabilizing of rollers after speed changes might be done perhaps by manipulation of the main control lever 102; but it would be extremely difficult, if possible, and would require a highly skilled hand. Means for returning the axes of the rollers to the main-axis-intersecting position have been described, namely, the inclined axis enforced by the oblique faces on ratio control levers 72 on which the roller trunnion blocks rotate while the rollers are tilting to vary speed ratio. By inspection of Fig. 4, it will be seen that the oblique faces on ratio control levers belonging to series of rollers 40 incline downward from right to left. When, therefore, a lever 72 has been inclined clockwise as described the axis of a roller 40 controlled by it will be moved so that its extension passes to one side of the main axis,—for example, axis of roller 40 shown in section in Fig. 3 would extend above it. Now as the roller "tilts"—in the sense indicated by the small arrows in Fig. 1—the axis will return to the plane containing the roll center and main axis; the line of the roller axis again intersects said main axis. The oblique faces of ratio control levers for rollers 41 are inclined reversely of those pertaining to rollers 40 since the drive from the driving race is opposite; but of course the inclination is the same relative to senses of movement.

The friction locking means adapts the main lever 102 to be locked in any position within its range of movement. Therefore changes of speed ratio may be made in theoretically infinite gradations within the range imposed by the machine design.

Although one particular embodiment of the invention has been described and illustrated it is not intended that the protection afforded shall be limited to the particulars disclosed, but that it shall be limited only by the appended claims.

I claim:

1. In a friction transmission, a race having a toric raceway, a friction roller engaging the raceway, said roller having an axis of rotation lying normally in a radial plane including the race axis and being inclinable in a plane transverse of the race axis and free to tilt around an axis fixed with respect to the axis of rotation of the roller and inclined with respect to a plane normal to the race axis.

2. In a friction transmission, a race having a toric raceway, a friction roller engaging the raceway, said roller having an axis of rotation lying normally in a radial plane including the race axis and being inclinable in a plane transverse of the race axis and free to tilt around an axis fixed with respect to the axis of rotation of the roller and with respect to a plane normal to the race axis in a plane normal to the roller axis.

3. In a friction transmission, a race having a toric raceway, a roller engaging said raceway, a roller supporting member including a trunnion on which the roller is journaled, said trunnion being adjustable in a plane substantially normal to the axis of the race, said roller being mounted to rotate on said trunnion and means on said trunnion providing an axis inclined to a radial plane including the roller center and the axis of the race around which the roller is free to tilt in order to change the path of contact between the roller and the raceway.

4. In a friction transmission, a race having a toric raceway, a roller engaging said raceway, a roller positioning member, a trunnion element constituting a ratio control means pivoted to said positioning member on which the roller is mounted to rotate so as to swing in a plane substantially normal to the axis of the race, and means on said trunnion providing an axis around which the rollers are free to tilt, said axis being inclined to a radial plane including the roller center and the race axis.

5. A friction transmission as defined in claim 4 in which the trunnion member is provided with opposite faces at an angle to the radial plane including the roller center and the race axis and trunnion blocks adapted to rotate on said inclined faces.

6. A friction transmission as defined in claim 4, in which the trunnion member is provided with opposite flat faces inclined at an angle to the radial plane including the roller center and the race axis and trunnion blocks adapted to rotate on said inclined faces, said trunnion blocks being free also to slide on said inclined faces toward and from the axis of the race way.

7. A friction transmission as defined in claim 4, in which the trunnion member is provided with opposite flat parallel faces slightly inclined to a radial plane including the roller center and the race axis in a plane normal to said radial plane and parallel to the race axis and provided also with parti-cylindrical trunnion blocks having flat faces, the flat faces of said trunnion blocks engaging the inclined faces of the trunnion member.

8. In a friction transmission, a race having a toric race way, a roller engaging said raceway, a roller positioning member, a trunnion mounted thereon so as to be adjustable in a plane substantially normal to the race axis, said trunnion including parti-cylindrical trunnion blocks, a bearing ring on which the roller rotates embracing said trunnion blocks, said trunnion and trunnion blocks having parallel engaging faces inclined slightly to said radial plane and said blocks and roller being free to tilt in the planes of said faces.

9. In a friction transmission, two races having opposed toric raceways, a friction roller engaging said raceways, said roller being free to tilt around an axis fixed with respect to the axis of rotation of the roller and inclined with respect to a plane normal to the race axis in a plane normal to the axis of rotation of the roller in order to change the paths of contact between the roller and the raceways.

10. In a friction transmission, two races each having a toric raceway facing the other, an intermediate race having a toric race way on each face, friction rollers interposed between said races, positioning means for said rollers, means for inclining each of said rollers simultaneously in a plane transverse of the axis of said raceways, each of said rollers being free to tilt about an axis fixed with respect to the axis of the roller and inclined with respect to a plane normal to the race axis in a plane normal to the axis of rotation of the roller.

11. In a friction transmission, a race having a toric raceway, a roller engaging said raceway, an arm for positioning said roller, a trunnion pivoted to said arm, said trunnion having two limbs embracing said arm and guided thereby, and means for guiding the tilting movement of the roller comprising opposite parallel faces on said trunnion inclined to a radial plane including the center of the roller and the race axis and trunnion blocks having parallel faces seated upon the inclined faces of the trunnion.

In testimony whereof we affix our signatures.

JACOB EHRLICH.
JOHN O. ALMEN.